United States Patent
Chen

(10) Patent No.: US 8,379,141 B2
(45) Date of Patent: Feb. 19, 2013

(54) METHOD OF DYNAMICALLY CHANGING A PARAMETER OF A FRAME

(75) Inventor: Chi-De Chen, Taipei (TW)

(73) Assignee: Ability Enterprise Co., Ltd., Taipei (TW)

( * ) Notice: Subject to any disclaimer, the term of this patent is extended or adjusted under 35 U.S.C. 154(b) by 337 days.

(21) Appl. No.: 12/830,217

(22) Filed: Jul. 2, 2010

(65) Prior Publication Data

US 2012/0002073 A1    Jan. 5, 2012

(51) Int. Cl.
*H04N 5/238* (2006.01)
*H04N 5/228* (2006.01)
*H04N 9/73* (2006.01)
*H04N 5/235* (2006.01)

(52) U.S. Cl. .................. 348/366; 348/222.1; 348/229.1; 348/362; 348/364

(58) Field of Classification Search ............... 348/222.1, 348/223.1, 229.1, 362–366
See application file for complete search history.

(56) References Cited

U.S. PATENT DOCUMENTS

2007/0025720 A1    2/2007    Raskar et al.
2009/0304275 A1    12/2009    Kodavalla et al.

FOREIGN PATENT DOCUMENTS

| CN | 101677366 A | 3/2010 |
|---|---|---|
| JP | 2007-329522 A | 12/2007 |
| JP | 2009-212810 A | 9/2009 |
| KR | 10-2000-0050769 A | 8/2000 |
| KR | 10-2005-0094213 A | 9/2005 |
| KR | 10-2008-0047190 A | 5/2008 |

*Primary Examiner* — John Villecco
*Assistant Examiner* — Mark Monk
(74) *Attorney, Agent, or Firm* — Muncy, Geissler, Olds & Lowe, PLLC

(57) ABSTRACT

A method of dynamically changing a parameter of a frame is disclosed. An input frame is determined as a special scene or a general scene. A subsequent frame is predicted by changing the parameter of the subsequent frame according to a special-scene operation when the input frame is the special scene, and by changing the parameter of the subsequent frame according to a general-scene operation when the input frame is not the special scene. The predicted frame is determined whether to be a special scene. Accordingly, the parameter of the input frame is changed according to the special-scene operation when both the input frame and the predicted frame are the special scenes; the parameter of the input frame is changed according to the general-scene operation when both the input frame and the predicted frame are not the special scenes; and the parameter of the input frame is maintained without change when only one of the input frame and the predicted frame is the special scene.

11 Claims, 2 Drawing Sheets

METHOD OF DYNAMICALLY CHANGING A PARAMETER OF A FRAME

BACKGROUND OF THE INVENTION

1. Field of the Invention

The present invention generally relates to an imaging device, and more particularly to a method of dynamically changing a parameter of a frame for a digital still camera or video camera.

2. Description of Related Art

Auto-exposure (AE) and auto white balance (AWB) are indispensable functions for a modern digital still camera or video camera. For example, the AE will increase brightness of a captured image in a backlight mode when a subject to be photographed is detected to be backlit. After the brightness has been increased, the subject is detected, however, not to be backlit. Accordingly, the AE will decrease or recover the brightness. The brightness increase and decrease may, unfortunately, repeat back and forth, thereby generating image flicker, which is usually called hunting phenomenon. In another example, the AWB will modify chrominance of a captured image in a nightfall mode when a subject to be photographed satisfies the nightfall mode specification or requirement. The chrominance may, unfortunately, be increased and decreased back and forth to result in the hunting phenomenon.

FIG. 1 shows a diagram illustrating the hunting phenomenon with respect to the backlight mode. In a normal situation (frame 1), the AE sets the brightness at 100%. When the backlight is detected or satisfied, the AE sets the brightness of a subsequent frame (frame 2) at 105%. After the brightness is increased to 105%, the backlight is no longer detected or satisfied, the AE thus sets the brightness of the next frame (frame 3) back to 100%. After the brightness is recovered back to (normal) 100%, the backlight is again detected or satisfied. The brightness increase and decrease in such back-and-forth manner, thereby generating image flicker or hunting phenomenon that causes annoyance to the user or viewer.

For the reason that conventional digital camera could be subjected to the hunting phenomenon, a need has arisen to propose a novel method to prevent the hunting phenomenon from happening.

SUMMARY OF THE INVENTION

In view of the foregoing, it is an object of the embodiment of the present invention to provide a method of dynamically changing a parameter of a frame in order to substantially prevent the hunting phenomenon.

According to one embodiment, an input frame is determined as a special scene that corresponds to a scene mode, or as a general scene that does not correspond to the scene mode. A subsequent frame is predicted by changing the parameter of the subsequent frame according to a special-scene operation when the input frame is the special scene, and by changing the parameter of the subsequent frame according to a general-scene operation when the input frame is not the special scene. The predicted frame is determined whether to be the special scene corresponding to the scene mode. Accordingly, the parameter of the input frame is changed according to the special-scene operation when both the input frame and the predicted frame are the special scenes; the parameter of the input frame is changed according to the general-scene operation when both the input frame and the predicted frame are not the special scenes; and the parameter of the input frame is maintained without change when only one of the input frame and the predicted frame is the special scene.

DETAILED DESCRIPTION OF THE INVENTION

Figure 1:
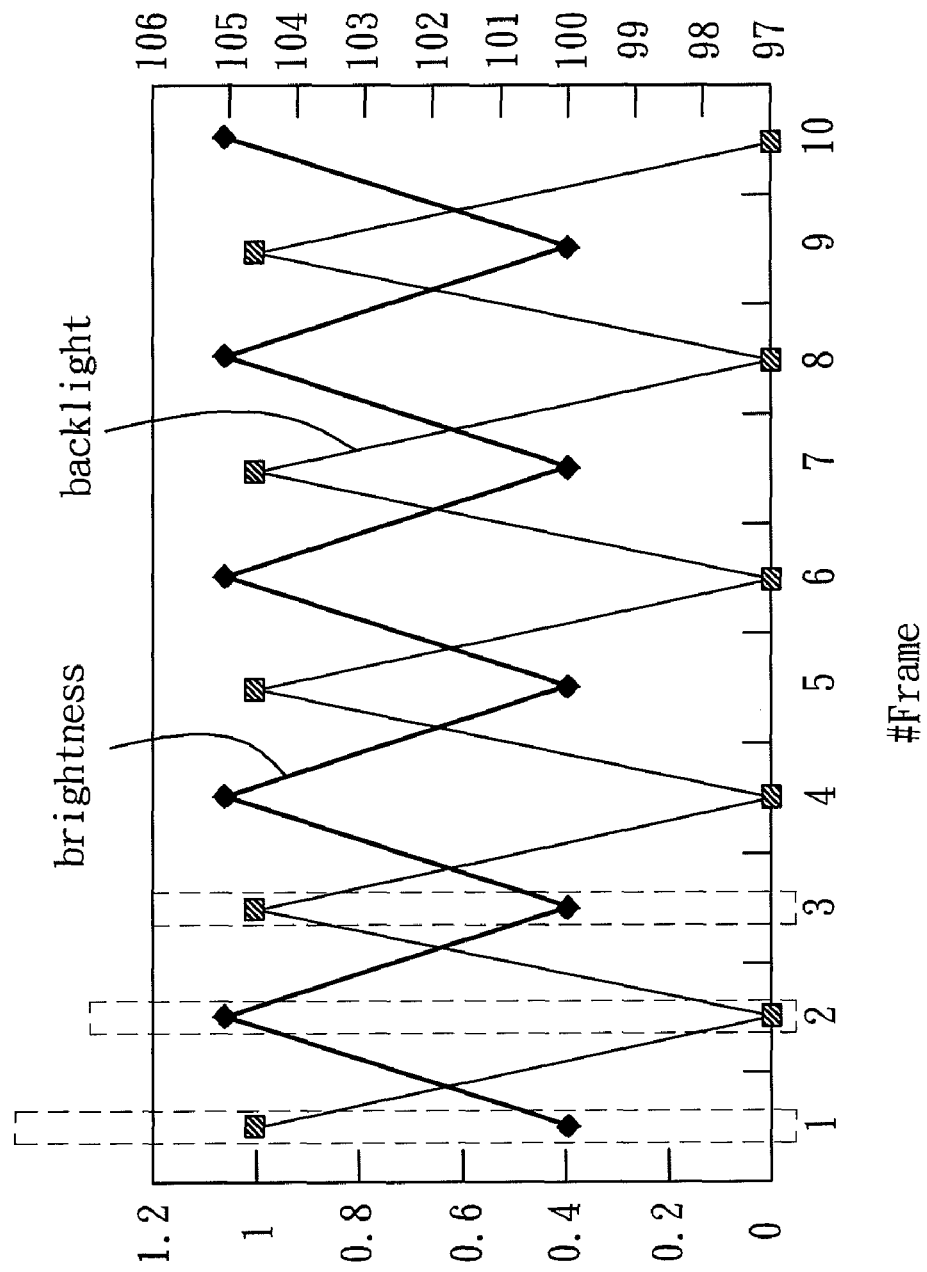
FIG. 1 shows a diagram illustrating the hunting phenomenon with respect to the backlight mode.
Figure 2:
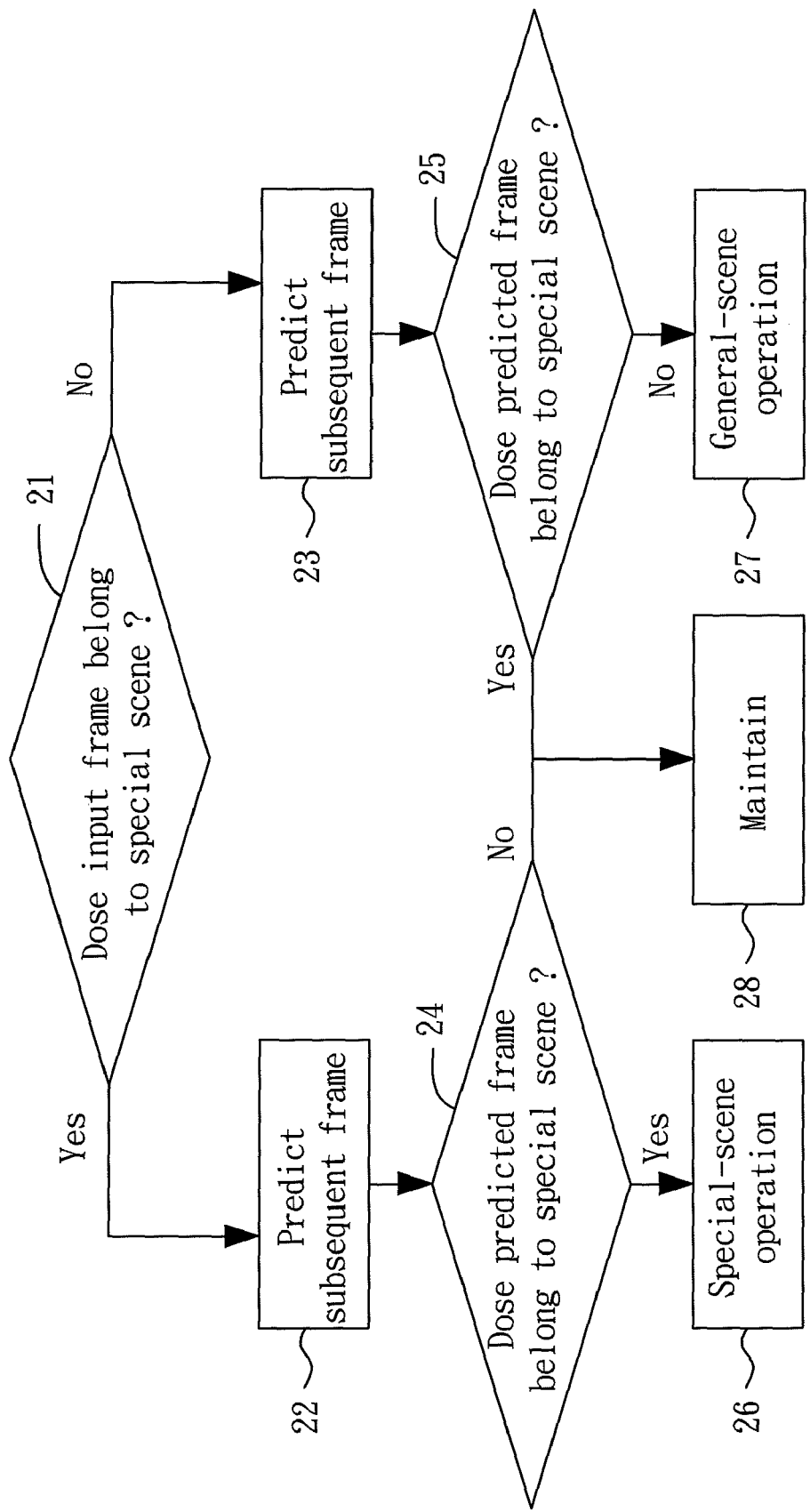
FIG. 2 shows a flow diagram that illustrates a method of dynamically changing a parameter of a frame according to one embodiment of the present invention.

FIG. 2 shows a flow diagram that illustrates a method of dynamically changing a parameter of a frame according to one embodiment of the present invention. The embodiment is adaptable, for example, to a digital camera, a mobile phone with a digital camera or a video camera. The frame may be an image in a preview mode in the digital camera, or may be a recorded image in the video camera.

In step 21, an input frame is determined whether to be a special scene corresponding to a scene mode, or to be a general scene not corresponding to the scene mode. In one exemplary embodiment, the scene mode is a backlight mode, in which a subject is backlit. The input frame is determined as a special scene when the input frame corresponds to (or satisfies) the specification or requirement of the backlight mode, or, in other words, the subject to be photographed is backlit. Otherwise, the input frame is determined as a general scene.

If the input frame is determined as a special scene, a subsequent frame is predicted, in step 22, by changing a parameter, e.g., brightness, of the subsequent frame according to a special-scene operation. Specifically, the special-scene operation is performed, for example, by an auto-exposure (AE) unit, by adjusting (e.g., increasing) the brightness with a predetermined amount.

On the other hand, if the input frame is determined as a general scene, a subsequent frame is predicted, in step 23, by changing a parameter, e.g., brightness, of the subsequent frame according to a general-scene operation. Specifically, the general-scene operation is performed, for example, by the auto-exposure (AE) unit, by inversely adjusting (e.g., decreasing) the brightness with a predetermined amount.

Afterwards, in step 24, the predicted frame from step 22 is then determined whether to be a special scene corresponding to the backlight mode, or to be a general scene not corresponding to the backlight mode. The determination of the predicted frame is similar to that of the input frame.

On the other hand, in step 25, the predicted frame from step 23 is then determined whether to be a special scene corresponding to the backlight mode, or to be a general scene not corresponding to the backlight mode.

When both the input frame and the predicted frame belong to the special scene, the parameter (e.g., the brightness) of the input frame is changed according to the special-scene operation (step 26). When both the input frame and the predicted frame do not belong to the special scene, the parameter (e.g., the brightness) of the input frame is changed according to the general-scene operation (step 27). When only one of the input frame and the predicted frame is the special scene, that is, in a boundary case, the parameter (e.g., the brightness) of the input frame is maintained without change (step 28).

According to the embodiment described above, the parameter of the input frame is not modified until the input frame and the predicted frame both belong to the special scene or both belong to the general scene. Accordingly, the hunting phenomenon oftentimes occurred in the conventional imaging device may be prevented.

Although the embodiment described above is demonstrated with the backlight mode, it is appreciated that the present invention may be adapted to other mode. For example, a nightfall mode is used immediately preceding or following sunset in order to correct biased yellowish image.

Specifically speaking, with respect to the nightfall mode, in step 21, an input frame is determined whether to be a special scene corresponding to the nightfall mode, or to be a general scene not corresponding to the nightfall mode. The input frame is determined as a special scene when the input frame corresponds to (or satisfies) the specification or requirement of the nightfall mode. Otherwise, the input frame is determined as a general scene.

If the input frame is determined as a special scene, a subsequent frame is predicted, in step 22, by changing a parameter, e.g., chrominance, of the subsequent frame according to a special-scene operation. Specifically, the special-scene operation is performed, for example, by an auto white balance (AWB) unit, by adjusting (e.g., increasing) a portion of the chrominance with a predetermined amount.

On the other hand, if the input frame is determined as a general scene, a subsequent frame is predicted, in step 23, by changing a parameter, e.g., chrominance, of the subsequent frame according to a general-scene operation. Specifically, the general-scene operation is performed, for example, by the auto white balance (AWB) unit, by inversely adjusting (e.g., decreasing) a portion of the chrominance with a predetermined amount.

Afterwards, in step 24, the predicted frame from step 22 is then determined whether to be a special scene corresponding to the nightfall mode, or to be a general scene not corresponding to the nightfall mode. The determination of the predicted frame is similar to that of the input frame.

On the other hand, in step 25, the predicted frame from step 23 is then determined whether to be a special scene corresponding to the nightfall mode, or to be a general scene not corresponding to the nightfall mode.

When both the input frame and the predicted frame belong to the special scene, the parameter (e.g., the chrominance) of the input frame is changed according to the special-scene operation (step 26). When both the input frame and the predicted frame do not belong to the special scene, the parameter (e.g., the chrominance) of the input frame is changed according to the general-scene operation (step 27). When only one of the input frame and the predicted frame is the special scene, that is, in a boundary case, the parameter (e.g., the chrominance) of the input frame is maintained without change (step 28).

Although specific embodiments have been illustrated and described, it will be appreciated by those skilled in the art that various modifications may be made without departing from the scope of the present invention, which is intended to be limited solely by the appended claims.

What is claimed is:

1. A method of dynamically changing a parameter of a frame, comprising:

determining whether an input frame is a special scene that corresponds to a scene mode, or is a general scene that does not correspond to the scene mode;

predicting a subsequent frame, wherein the predicted frame is obtained by changing the parameter of the subsequent frame according to a special-scene operation when the input frame is the special scene, or the predicted frame is obtained by changing the parameter of the subsequent frame according to a general-scene operation when the input frame is not the special scene;

and determining whether the predicted frame is the special scene corresponding to the scene mode;

wherein the parameter of the input frame is changed according to the special-scene operation when both the input frame and the predicted frame are the special scenes;

wherein the parameter of the input frame is changed according to the general-scene operation when both the input frame and the predicted frame are not the special scenes;

and wherein the parameter of the input frame is maintained without change when only one of the input frame and the predicted frame is the special scene.

2. The method of claim 1, wherein the parameter is brightness.

3. The method of claim 2, wherein the special-scene operation comprises a step of adjusting the brightness with a predetermined amount, and the general-scene operation comprises a step of inversely adjusting the brightness with a predetermined amount.

4. The method of claim 3, wherein the adjustment of the brightness is performed by an auto-exposure (AE) unit.

5. The method of claim 2, wherein the scene mode is a backlight mode, in which a subject is backlit.

6. The method of claim 5, wherein the special-scene operation comprises a step of increasing the brightness with a predetermined amount, and the general-scene operation comprises a step of decreasing the brightness with a predetermined amount.

7. The method of claim 1, wherein the parameter is chrominance.

8. The method of claim 7, wherein the special-scene operation comprises a step of adjusting a portion of the chrominance with a predetermined amount, and the general-scene operation comprises a step of inversely adjusting said portion of the chrominance with a predetermined amount.

9. The method of claim 8, wherein the adjustment of the chrominance is performed by an auto white balance (AWB) unit.

10. The method of claim 1, wherein the input frame and the subsequent frame are two adjacent frames in a preview mode in a digital camera, thereby the input frame being displayed without hunting.

11. The method of claim 1, wherein the input frame and the subsequent frame are two adjacent frames recorded in a video camera, thereby the input frame being displayed without hunting.

* * * * *